Jan. 20, 1931. H. A. WALLACE 1,789,919
RAILWAY TRAFFIC CONTROLLING APPARATUS
Filed Sept. 8, 1923 4 Sheets-Sheet 1

INVENTOR:
H. A. Wallace,
BY
His ATTORNEY

Jan. 20, 1931. H. A. WALLACE 1,789,919
RAILWAY TRAFFIC CONTROLLING APPARATUS
Filed Sept. 8, 1923 4 Sheets-Sheet 3

INVENTOR:
H. A. Wallace,
by his Attorney

Jan. 20, 1931.     H. A. WALLACE     1,789,919
RAILWAY TRAFFIC CONTROLLING APPARATUS
Filed Sept. 8, 1923     4 Sheets-Sheet 4

INVENTOR:
H. A. Wallace,
BY *(signature)*
His ATTORNEY

Patented Jan. 20, 1931

1,789,919

UNITED STATES PATENT OFFICE

HERBERT A. WALLACE, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Application filed September 8, 1923. Serial No. 661,672.

My invention relates to railway traffic controlling apparatus.

I will describe several forms of railway traffic controlling apparatus embodying my invention, and will then point out the novel features thereof in claims.

In the accompanying drawings.

Similar reference characters refer to similar parts in each of the several views.

Figure 1:
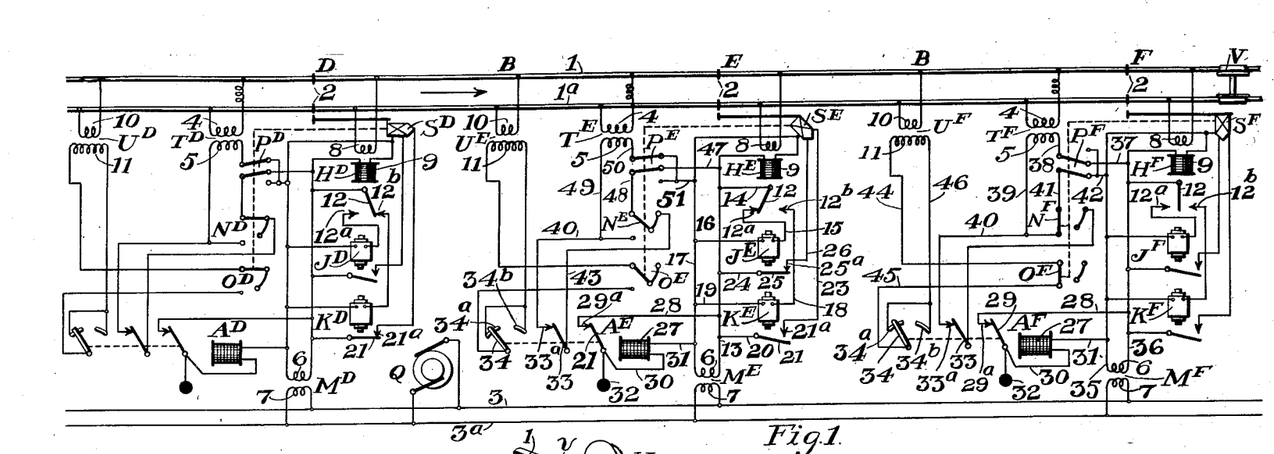
Fig. 1 is a diagrammatic view showing one form of trackway apparatus embodying my invention.

Referring first to Fig. 1, the reference characters 1 and $1^a$ designate the track rails of a railroad over which traffic normally moves in the direction indicated by the arrow. These rails are divided, by means of insulated joints 2, into a plurality of successive track sections D—E, E—F, etc., the rails of each such section being made electrically continuous. Each track section is provided with a track relay located adjacent the entrance end of the section and designated by the reference character H with an exponent corresponding to the location. Each track relay H comprises a track winding 8 connected across the rails, and a second winding 9 constantly supplied with alternating current by secondary 6 of an associated line transformer designated by the reference character M with an exponent corresponding to the location. The primary 7 of each line transformer M is constantly supplied with alternating current over transmission wires 3 and $3^a$ from generator Q. It will be clear from the foregoing that when alternating current is supplied as explained hereinafter to the rails of a section, and when the section is unoccupied, the associated track relay is energized in one diretcion or the other, depending upon the instantaneous relative polarity of such current. When such alternating current is of what I sahll term "normal relative polarity", the relay is energized in the normal direction and armature 12 is swung toward the right thus closing contact 12—$12^b$. When the alternating current is of reverse relative polarity, the relay is energized in the reverse direction and contact 12—$12^a$ is closed. When the supply of alternating current to either of windings 8 or 9 is interrupted, armature 12 assumes an intermediate position wherein contacts 12—$12^a$ and 12—$12^b$ are both open.

Each section is further provided with two slow acting relays located adjacent the entrance end of the associated section and designated by the reference characters J and K with exponents corresponding to the location. Referring particularly to section E—F, relay $J^E$ is energized only when track relay $H^E$ is energized in the reverse direction. The circuit for this relay passes from secondary 6 of line transformer $M^E$, through wires 13 and 14, reverse contact 12—$12^a$ of track relay $H^E$, wire 15, winding of relay $J^E$, and wires 16 and 17 back to secondary 6 of line transformer $M^E$. Relay $K^E$ is energized only when track relay $H^E$ is energized in the normal direction, and its circuit passes from secondary 6 of transformer $M^E$, through wires 13 and 14, normal contact 12—$12^b$ of track relay $H^E$, wire 18, winding of relay $K^E$, and wires 19 and 17 back to secondary 6 of transformer $M^E$.

Each track section is provided with a signal designated by the reference character S with a suitable exponent. As here shown each such signal is located adjacent the entrance end of the associated section and is of the three-position semaphore type comprising a semaphore blade capable of assuming three distinctive positions in which the signal displays a "proceed", a "caution", or a "stop" indication, although this particular location and construction is not necessary. Referring particularly to section E—F, the operating mechanism of signal S$^E$ is provided with a proceed circuit which passes from secondary 6 of transformer M$^E$, through wires 13 and 20, front contact 21—21$^a$ of relay K$^E$, wire 23, operating mechanism of signal S$^E$, and wire 17 back to secondary 6 of transformer M$^E$. Signal S$^E$ is also provided with a caution circuit over which current passes from secondary 6 of line transformer M$^E$, through wires 13 and 24, front contact 25—25$^a$ of relay J$^E$, wire 26, operating mechanism of signal S$^E$, and wire 17 back to secondary 6 of transformer M$^E$. It will therefore be plain that when relay J$^E$ is energized, signal S$^E$ displays a caution indication, when relay K$^E$ is energized, signal S$^E$ displays a proceed indication, and when relays J$^E$ and K$^E$ are both deenergized, signal S$^E$ displays a stop indication. In other words, signal S$^E$ indicates caution or proceed according as relay H$^E$ is energized in reverse or normal direction, and stop when relay H$^E$ is de-energized.

Although in the present disclosure I have shown slow-releasing relays J and K between each track relay H and the associated signal, the function of which relays is to bridge the intervals which occur during which the track relay is de-energized under caution and proceed traffic conditions as will appear hereinafter, it is understood that such slow-releasing relays are required only with signals of certain types, and that they will not be required when the signals themselves have slow-releasing characteristics.

Each track section is also provided with a circuit controller designated by the reference character A with an appropriate exponent. Each of these circuit controllers as here shown, comprises three movable contact fingers 34, 33 and 29, adapted to swing in unison on their pivots and cooperate with certain fixed contacts, which fingers are biased to their extreme left hand positions by a pendulum 32. These fingers are operated by an electro-magnet 27 which is provided with a circuit (see controller A$^F$) passing from the secondary 6 of transformer M$^F$, through wires 36 and 28, contact 29—29$^a$ of device A, wire 30, winding of magnet 27, and wires 31 and 35 back to transformer M$^F$. When finger 29 is in its left hand position, magnet 27 is energized, thus drawing all three of the contact fingers towards their right hand positions. This movement opens the circuit for magnet 27 which allows the fingers to swing back to their left hand positions. This vibration or oscillation continues as long as transformer M$^F$ is energized. The pendulum 32 not only biases the contact fingers, but also stabilizes the controller and renders very constant the time period of oscillation. For purposes of convenience it will be understood that whenever hereinafter I refer to a "stroke" of a circuit controller A, I shall mean a movement of the contact fingers from left to right or from right to left, whereas, when I refer to a "cycle" of a circuit controller A, I shall mean a complete oscillation consisting of two consecutive strokes. The time period required for a cycle obviously may be adjusted to any desired value and for purposes of convenience in explanation I will assume that each controller A requires one second of time to complete a stroke and hence each complete cycle consumes two seconds.

A fixed contact 33$^a$ is arranged to cooperate with movable finger 33 at the left hand end of each cycle. It follows that the circuit including contact finger 33 will be closed for only a short interval of time once each two seconds. The contact finger 34 engages two fixed contacts 34$^a$ and 34$^b$ which latter contacts are connected together electrically and are so disposed that finger 34 engages one or the other at all times except for a short time interval once during each stroke. It follows that the circuit including contact finger 34 will be opened for only a short interval of time once each second. A controller constructed as just described may be made to oscillate with a very constant time period but it should be understood that any equivalent controllers may be substituted for the controller A without departing from my invention.

Each track section is further provided with a main track transformer designated by the reference character T with a suitable exponent, and having its secondary 4 connected across the rails adjacent the exit end of the section. An auxiliary track transformer designated by the reference character U with an appropriate exponent has a winding 10 connected across the rails at an intermediate point B in the section.

Referring particularly to section E—F, transformer T$^F$ is provided with one circuit which passes from secondary 6 of transformer M$^F$, through wires 36 and 37, pole-changer P$^F$ operated by signal S$^F$, wire 38, primary 5 of transformer T$^F$, wires 39 and 40, circuit controller N$^F$ operated by signal S$^F$, wire 41, pole-changer P$^F$, and wires 42 and 35 back to secondary 6 of transformer M$^F$. This circuit is closed only when signal S$^F$ indicates stop, under which condition alternating current of reverse relative polarity is constantly supplied to the rails of section E—F. When signal S$^F$ is at stop, however, another circuit is closed which passes from one terminal of winding 11 of transformer U$^F$, through wire 44, circuit controller O$^F$ operated by signal S$^F$, wire 45, contact 34—34$^a$ or 34—34$^b$ of device A$^F$, and wire 46 back to winding 11 of transformer U$^F$. It will be observed that the circuit just traced is a path of low resistance for winding 11 of transformer U$^F$. When the circuit just traced for winding 11 is open, the impedance of winding 10 is comparatively high, whereas when the circuit for winding 11 is closed, the impedance of winding 10 is comparatively low. It will thus be clear that when the circuit for winding 11 is closed, winding 10 shunts the alternating current supplied to section E—F by transformer T$^F$. The effectiveness of this shunt may be increased by making winding 11 of a large number of turns compared with winding 10. When signal S$^F$ indicates stop, therefore, section E—F is continuously supplied with alternating current between point F and point B, and is supplied between point E and point B with energy in the form of successive groups of alternating current impulses each group comprising several alternations and each such group being separated from the preceding group by a time interval of substantially one second. That is to say, this latter portion of the section is supplied with alternating current only when contact 34 is open, and this only occurs for a short interval once each second.

When a signal indicates proceed or caution, the circuits controlled thereby are as follows: Referring particularly to signal S$^E$, which is here shown as indicating caution, the circuit for winding 11 of transformer U$^E$ is open at circuit controller O$^E$ operated by signal S$^E$ and the winding 10 therefore has a high impedance, rendering this winding ineffective to shunt the track circuit current. The circuit for transformer T$^E$ passes from secondary 6 of transformer M$^E$, through wires 13 and 47, pole-changer P$^E$ operated by signal S$^E$, wire 48, circuit controller N$^E$ operated by signal S$^E$, wire 43, contact 33—33$^a$ of controller A$^E$, wires 40 and 49, primary 5 of track transformer T$^E$, wire 50, pole-changer P$^E$, and wires 51 and 17 back to secondary 6 of transformer M$^E$. When a signal indicates "proceed" the circuits are the same, because (see signal S$^D$) controller O is still closed, the upper contact of controller N is still closed, and pole-changer P occupies the same position as when the signal is at caution.

It will thus be plain that when a signal is at proceed or caution, the section in the rear is supplied throughout its length with energy from the associated transformer T in the form of successive groups of impulses of alternating current of normal relative polarity, each group comprising several alternations and each group being separated from the preceding group by a time interval of substantially two seconds. This is because contact 33—33$^a$ is closed only once every two seconds.

The operation of the trackway apparatus as a whole is as follows: As shown in the drawing the section to the right of point F is occupied by a vehicle here shown diagrammatically and designated by the reference character V. As a result track relay H$^F$ is de-energized. Relays J$^F$ and K$^F$ are therefore both de-energized, and signal S$^F$ indicates stop. As explained hereinbefore, under these conditions section E—F is constantly supplied with alternating current of reverse relative polarity between point B and point F, and is intermittently supplied with similar current between point B and point E at intervals of one second. Track relay H$^E$ is therefore briefly energized in the reverse direction once each second. Relay K$^E$ is therefore de-energized, but each time reverse contact 12—12$^a$ is closed relay J$^E$ is energized, and due to the slow-releasing feature of this relay its front contact 25—25$^a$ remains closed during the next interval of de-energization. Signal S$^E$ therefore indicates caution. Section D—E is now intermittently supplied with alternating current of normal relative polarity throughout its length at intervals of two seconds. Track relay H$^D$ is therefore energized in the normal direction once each two seconds. Relay J$^D$ is therefore, de-energized, but due to the periodic energization of relay K$^D$ and to the slow-releasing characteristic of this relay its front contact remains closed as explained in connection with relay J$^E$, and signal S$^D$ is therefore at proceed. Current is then supplied to the section to the left of point D exactly as to section D—E.

Figure 2:
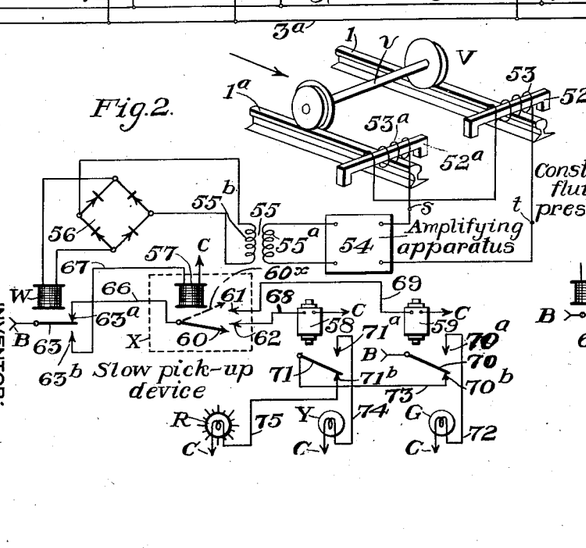
Fig. 2 is a diagrammatic view showing one form of train-carried apparatus also embodying my invention and suitable for co-operation with the trackway apparatus shown in Fig. 1.

Referring now to Fig. 2, I will explain one form of governing mechanism adapted to co-operate with the trackway apparatus just described. In this drawing I have shown the mechanism on a train, though it can equally well be used at a wayside location. Mounted in front of the forward axle $v$ of a train V are two magnetizable cores 52 and 52$^a$ in inductive relation to the track rails 1 and 1$^a$, respectively. Core 52 is provided with a winding 53, and core 52$^a$ is provided with a similar winding 53$^a$. The two windings 53 and 53$^a$ are connected in series in such a manner that the currents induced in these two windings by alternating currents flowing in opposite directions at any instant in the track rails will be additive. The windings 53 and 53$^a$, I shall hereinafter refer to collectively as "the track coil". The terminals $s$ and $t$ of this track coil are connected, through some suitable amplifying apparatus 54, to the primary 55$^a$ of a transformer 55. The secondary 55$^b$ of this transformer is connected with a relay W which for purposes of simplicity I shall call the "main relay". Interposed between secondary 55$^b$ of transformer 55 and relay W is a rectifier 56 of some suitable form. One purpose of this rectifier is to enable the use of a direct current main relay. If the rectifier were not interposed an alternating current relay would be necessary which is not as efficient. For purposes of my invention either arrangement may be used. Alternating current supplied by transformer secondary 55$^b$ is transformed by rectifier 56 into a substantially uni-directional current which energizes relay W. Relay W is energized, only when direct current is supplied thereto by rectifier 56, but this rectifier can be supplied with alternating current only through transformer 55 to which energy is supplied in accordance with current flowing in the track rails. It follows that relay W will be energized only when a current capable of inducing an alternating voltage in the track coil is flowing in rails 1 and 1$^a$.

Some suitable form of selecting means, here shown as a time measuring device X, is controlled by relay W. As shown in the drawing this time measuring device X comprises a motor device 57 and a movable contact finger 60 operated thereby. Two fixed contact members 61 and 62 co-operate with finger 60. The parts are so designed and proportioned that after device 57 has been energized for a time interval approximately equal to the closed circuit period of contacts 34—34$^a$ and 34—34$^b$ of circuit controller A in Fig. 1, contact 60—62 closes, and that after the device 57 has been energized for a time interval approximately equal to the open circuit period of contact 33—33$^a$ of controller A, contact 60—61 closes. In other words, energization of device X for approximately one second is required to close contact 60—62, and energization for approximately two seconds is required to close contact 60—61. The motor device 57 is energized from a suitable source of energy, not shown in the drawing but provided with two terminals B and C, over the following circuit: From one terminal B of the source, through back contact 63—63$^b$ of relay W, wire 67, motor device 57, and back to the other terminal C of the source. It is therefore clear that motor device 57 will be energized only when relay W is de-energized.

Associated with device X are two auxiliary relays 58 and 59. These relays are controlled as will be explained hereinafter and they control, in turn, governing mechanism of any desired form. As here shown this mechanism comprises three signal lamps G, Y and R, which may be mounted in the cab of the locomotive to acquaint the engineman with traffic conditions in advance. The circuit for lamp G passes from one terminal B of the energy source, through front contact 70—70$^a$ of relay 59, wire 72, and lamp G back to terminal C of the energy source. This circuit is closed only when relay 59 is energized, under which condition lamp G is lighted and a proceed indication is given by the signal. If relay 59 is de-energized and relay 58 is energized, lamp Y is lighted over a circuit which passes from terminal B through back contact 70—70$^b$ of relay 59, wire 73, front contact 71—71$^a$ of relay 58, wire 74, lamp Y, back to terminal C of the energy source, thus giving a caution indication aboard the locomotive. If both relays 58 and 59 are de-energized, a stop indication is displayed by the lighting of lamp R over a circuit which passes from one terminal B of the energy source, through back contact 70—70$^b$ of relay 59, wire 73, back contact 71—71$^b$ of relay 58, wire 75, lamp R, and back to terminal C of the energy source. The lamps R, Y and G may be given distinctive colors as red, yellow and green, in accordance with standard signaling practice to indicate "stop", "caution" and "proceed", respectively.

I will first assume that the track rails are supplied with energy in the form of successive groups of current impulses, each group being separated from the preceding group by a time interval of substantially one second. Relay W will be periodically energized once each second, but during the time interval between successive energizations the relay will of course be de-energized, and the circuit for motor device 57 will be closed, so that at the expiration of this interval contact 60—62 will be closed. Each time relay W is energized and before contact 60—62 has time to open, current will be momentarily delivered to auxiliary slow-releasing relay 58 over a circuit which passes from one terminal B of the energy source, through front contact 63—63$^a$ of main relay W, wire 66, contact 60—62 of device X, wire 68, winding of auxiliary relay 58, and back to the other terminal C of the energy source. When relay W opens, relay 58 is of course de-energized but its slow-releasing feature prevents its front contact 71—71$^a$ opening during the one second interval in which relay W is open, and so this contact remains closed as long as relay W is intermittently energized at the proper intervals. Lamp Y is therefore lighted and the train receives a caution indication.

If the track rails are periodically supplied with groups of current impulses at intervals of substantially two seconds, the longer periods of de-energization of relay W allow contact 60—61 to close and the following circuit is closed for the second auxiliary relay 59 each time relay W is energized. From one terminal B of the energy source, through front contact 63—63$^a$ of relay W, wire 66, contact 60—61 of device X, wire 69, winding of relay 59, and back to the other terminal C of the energy source. The front contact 70—70ᵃ of relay 59 is kept closed by this periodic energy supply just as explained in connection with relay 58. Under this condition lamp G is lighted and the train receives a proceed indication. It is clear that any desired number of auxiliary relays could thus be selectively operated by track circuit currents of different characteristics. It should be particularly noted that a continuously alternating current in the track rails would cause a constant energization of relay W. As a result the contacts of device X would remain open and both relays 58 and 59 would be de-energized. This condition is assumed to exist in Fig. 2 and the parts are illustrated in corresponding positions. If no current or if steady direct current should flow in the track rail, no energy is induced in the track coil and relay W is constantly de-energized. As a result armature 60 would be moved into its extreme upper position, indicated in broken lines at 60ˣ in the drawing, in which position contacts 60—61 and 60—62 would both be open. In either of the cases just mentioned relays 58 and 59 would both be de-energized and lamp R would therefore be lighted and the train would receive a stop indication.

Referring now to Figs. 1 and 2, it will be clear that as a train equipped with the apparatus illustrated in Fig. 2 proceeds along the stretch of track shown in the drawing, the train will receive a proceed indication while it traverses section D—E. As the train passes through section E—F, however, it will receive a caution indication between point E and point B, and between point B and point F the uninterrupted alternating current causes the train to receive a stop indication.

Figure 3:
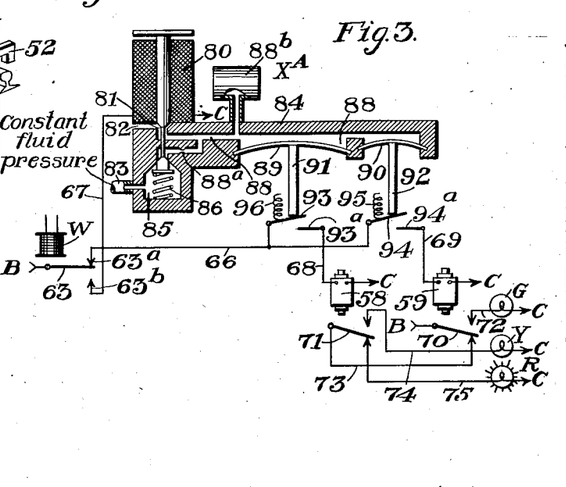
Fig. 3 is a view showing a modification of the train-carried apparatus shown in Fig. 2 and also embodying my invention.

A modification of the train-carried apparatus is shown in Fig. 3, where an electro-pneumatic device Xᴬ is substituted for device X of Fig. 2. This device comprises a valve body 84 having a valve chamber 85 constantly supplied with fluid pressure through port 83. The valve body 84 also contains a chamber 88 constantly connected with a timing reservoir 88ᵇ. In the wall of chamber 88 are a diaphragm 90 of comparatively small area carrying a stem 92, and a second diaphragm 89 of comparatively large area carrying a stem 91. Owing to their natural resilience and to the actions of springs 95 and 96, these diaphragms are biased to the positions shown in the drawing. Interposed between chambers 85 and 88 is a valve 81 controlled by an electro-magnet 80. The valve 81 is normally biased by a spring 86 into a position in which chamber 88 is connected with atmosphere through a port 82. When magnet 80 is energized, however, valve 81 is reversed, closing communication between chamber 88 and port 82, and connecting chamber 88 with chamber 85, thereby allowing fluid pressure to be supplied slowly to chamber 88 and reservoir 88ᵇ through a restricted passage 88ᵃ. When the pressure in chamber 88 builds up to a predetermined value diaphragm 89 is moved outward causing its stem 91 to move contact finger 93 against the bias of spring 96 and close contact 93—93ᵃ. As the pressure in chamber 88 builds up to a higher predetermined value, diaphragm 90 is moved outward and stem 92 closes a contact 94—94ᵃ normally held open by spring 95. Magnet 80 is connected in series with a source of energy and back contact 63—63ᵇ of relay W, and contacts 93—93ᵃ and 94—94ᵃ control relays 58 and 59 in the same manner as contacts 60—62 and 60—61 control these relays in Fig. 6. The passage 88ᵃ through which fluid pressure is admitted to chamber 88, the volume of timing reservoir 88ᵇ, and the diaphragms 89 and 90 are so designed that when relay W is being periodically energized by a caution code in the track rails the time interval between successive energizations of relay W is sufficient to permit the pressure in chamber 88 to rise to the value necessary to close contact 93—93ᵃ and thus permit relay 58 to become energized, but is not sufficient to permit the pressure to rise to the value necessary to close contact 94—94ᵃ. If, however, relay W is periodically energized in accordance with the proceed code, the longer intervals of de-energization of this relay will then permit the pressure in chamber 88 to rise to the value necessary to close contact 94—94ᵃ as well as contact 93—93ᵃ, and both relays 58 and 59 will be energized. These relays control the visual indicators or other governing mechanism in the same manner as in Fig. 2. It will be noticed that port 82 is sufficiently large to allow the pressure in chamber 88 and reservoir 88ᵇ to be reduced to atmospheric pressure during the brief period in which relay W is energized.

Figure 4:
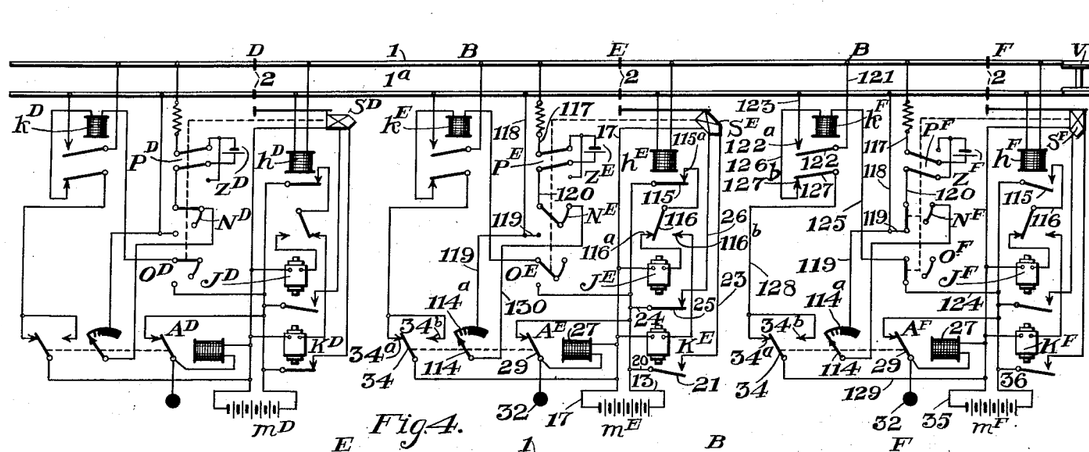
Figs. 4, 5, 6 and 7 are views showing modifications of the trackway apparatus shown in Fig. 1 and embodying my invention, and each of which is suitable for co-operation with the train-carried apparatus shown in either Fig. 2 or 3.

Referring now to Fig. 4, in the modified form of trackway apparatus here shown each signal S is controlled as before by two relays J and K associated therewith, the energy for its operation being supplied from a battery designated in the drawing by the reference character $m$ with an exponent corresponding to the location. The track relays here designated $h$ with exponents corresponding to the location are of the direct current polarized type each comprising a neutral armature 115 and a polarized armature 116. Referring particularly to track relay $h^E$, when this relay is energized in the normal direction, relay $K^E$ is energized by battery $m^E$ over front contact 115—115ᵃ and normal contact 116—116ᵇ of relay $h^E$, and signal $S^E$ then displays a proceed indication. When relay $h^E$ is energized in the reverse direction, relay $J^E$ is energized by battery $m^E$ over front contact 115—115ᵃ and reverse contact 116—116ᵃ, and signal $S^E$ then displays a caution indication. When relay $h^E$ is de-energized, relays $J^E$ and $K^E$ are both de-energized and signal $S^E$ displays a stop indication.

Each circuit controller A is constantly operated as in Fig. 1, but finger 34 engages fixed contact $34^a$ or $34^b$ only for a brief interval at each end of its stroke. The finger 33 of Fig. 1 is replaced by a finger 114 which bears on a contacting segment $114^a$ provided with several teeth adjacent one end. It will be plain that as finger 114 moves back and forth the circuit including contact 114—$114^a$ will be closed throughout the greater part of each cycle, but will be briefly interrupted several times at the left hand end of each cycle.

Referring particularly to section E—F, this section is provided with continuous direct track circuit current of reverse relative polarity when signal $S^F$ indicates stop, over the following circuit: from one terminal of a source of direct current such as battery $Z^F$, through pole-changer $P^F$ operated by signal $S^F$, wire 117, rail 1 of section E—F, through relay $h^E$ or a shunt across the rails of the section, rail $1^a$, wires 118 and 119, circuit controller $N^F$ operated by signal $S^F$, wire 120, and pole-changer $P^F$ back to battery $Z^F$.

At the same time a circuit is closed for an auxiliary relay $k^F$, which circuit is from battery $m^F$, through wires 36 and 124, circuit controller $O^F$ operated by signal $S^F$, wire 125, relay $k^F$, wire 126, back contact 127—$127^b$ of relay $k^F$, wire 128, contact 34—$34^a$ or 34—$34^b$ of controller $A^F$, and wires 129 and 35 back to battery $m^F$. This circuit is closed once during each stroke of controller $A^F$, and while it is closed relay $k^F$ is caused to vibrate because the circuit for this relay includes its own back contact 127—$127^b$. Each time relay $k^F$ becomes energized, a path of low resistance is completed across the rails of section E—F as follows: from rail 1, through wire 121, front contact 122—$122^a$, and wire 123 back to rail $1^a$. It will thus be clear that under these conditions, that is, when signal $S^F$ is at stop, section E—F is supplied with continuous direct current between point F and point B, whereas between points E and B, the current supplied to the trackway is in accordance with the caution code because once during each stroke of controller A the continuous direct current track circuit is intermittently shunted several times thus breaking up the current into a group of impulses. During the interval between each two groups, steady direct current flows in the track circuit but this current cannot affect the train-carried apparatus. The polarity of the current thus supplied to the rails of section E—F is such that relay $h^E$ is energized in the reverse direction. Signal $S^E$ therefore indicates caution. Under this condition the circuit for relay $k^E$ in section D—E is permanently open at circuit controller $O^E$ on signal $S^E$ and the shunt across the rails of section D—E is therefore ineffective. A circuit is now established which passes from battery $Z^E$, through pole-changer $P^E$, wire 117, rail 1 of section D—E, relay $h^D$ or a shunt in the section, rail $1^a$, wires 118 and 119, contact 114—$114^a$ of controller $A^E$, wire 130, circuit controller $N^E$, wire 120 and pole-changer $P^E$, back to battery $Z^E$. When this circuit is closed it is clear that section D—E is supplied with energy in the form of direct current of normal relative polarity and that this current is broken up into a group of impulses once each two seconds. This is therefore the proceed code. It is believed that the operation of the apparatus will be obvious without further explanation. The trackway apparatus here shown is of course adapted to cooperate with the train-carried apparatus previously described just as in the case of Fig. 1.

Figure 5:
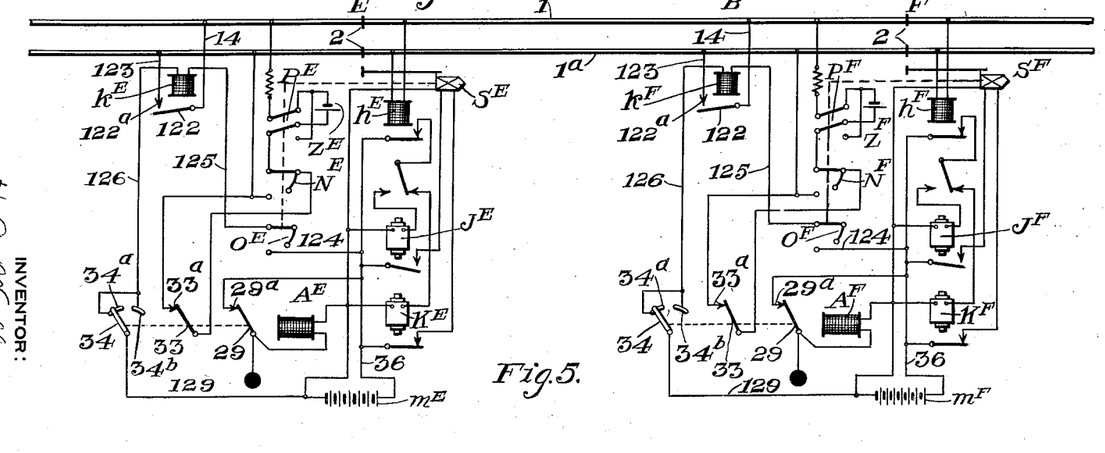

Referring now to Fig. 5, the apparatus is so arranged that in place of groups of impulses separated by time intervals as in Fig. 4, the trackway is supplied with a series of single impulses, each impulse being separated from the preceding impulse by a time interval, the duration of which is dependent upon traffic conditions in advance. The operation will be evident from the drawing in which the proceed code, consisting of an impulse every two seconds, is supplied to the section E—F by battery $Z^F$ over contact 33—$33^a$ and circuit controller $N^F$ operated by signal $S^F$. The circuit for supplying the proceed code is closed only when the associated signal indicates caution or proceed. In case signal $S^F$ indicates stop, a circuit is closed over which current passes from battery $m^F$, through wires 36 and 124, circuit controller $O^F$ on signal $S^F$, wire 125, winding of relay $k^F$, wire 126, contact 34—$34^a$ or 34—$34^b$ of device $A^F$, and wire 129 back to battery $m^F$. Since controller $A^F$ operates continuously, it follows that when the circuit just traced is completed at circuit controller $O^F$, relay $k^F$ is de-energized once each second, the contacts $34^a$ and $34^b$ being proportioned as in Fig. 1. Each time relay $k^F$ is energized, a path of low resistance is closed across the rails of section E—F at point B, just as in Fig. 2, thus discontinuing the supply of energy between points E and B. It therefore follows that when signal $S^F$ is at stop, the portion of section E—F between point B and point F is supplied with continuous energy, whereas the portion of the section between point B and point E is briefly supplied with energy once each second.

The single impulses thus supplied to the trackway are picked up by the train-carried apparatus and control the governing mechanism in the same manner as explained hereinbefore for groups of impulses, since it will be plain that in Figs. 2 and 3 the differentiation between signal indications received on the train is obtained by measuring the time intervals between successive impulses, or groups of impulses, and not by measuring the duration of these impulses or groups of impulses.

Figure 6:
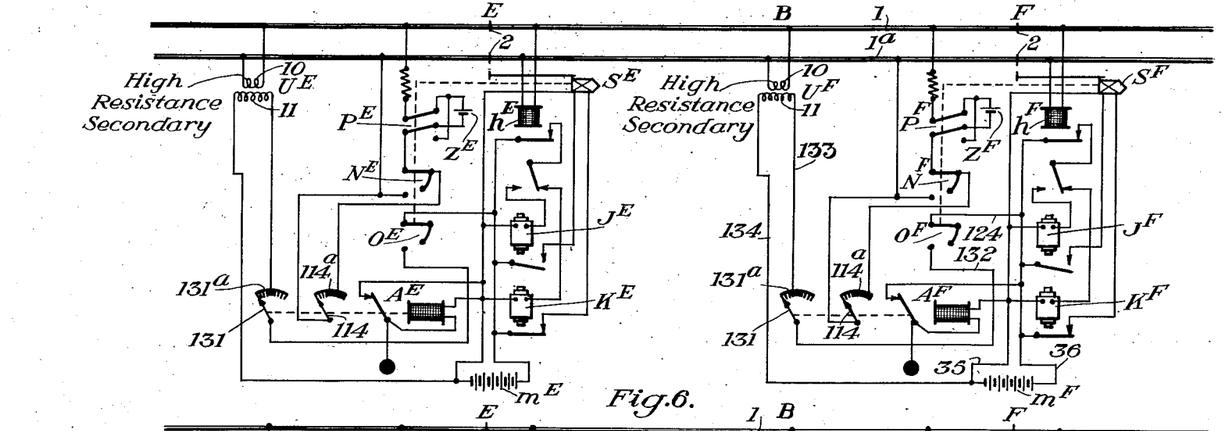

In Fig. 6, the proceed code is supplied to the trackway in the same manner as in Fig. 4, but the relay $k$ for creating a low resistance shunt at point B is replaced by the secondary 10 of an auxiliary track transformer U connected directly across the track rails. The transformer is so constructed that the ohmic resistance of the secondary 10 is comparatively high. Finger 34 of each circuit controller A is replaced by a finger 131, which co-operates with a sector 131$^a$ having several teeth near each extremity. It follows that as controller A oscillates the circuit containing contact 131—131$^a$ will be opened several times in quick succession at two places in each complete cycle of the controller, so that a group of interruptions will occur once each second. Referring particularly to section E—F, primary winding 11 of transformer U$^F$ is provided with a circuit which passes from battery $m^F$ through wires 36 and 124, circuit controller O$^F$ on signal S$^F$, wire 132, contact 131—131$^a$ of controller A$^F$, wire 133, primary 11 of transformer U$^F$, and wire 134 back to battery $m^F$. This circuit is closed only when signal S$^F$ indicates stop, under which condition direct current is supplied to primary 11 of transformer U$^F$ in groups of impulses separated by time intervals of substantially one second. The impulses in primary 11 induce alternating current in secondary 10 which is connected directly with the track rails, and the caution code is thus supplied to the section between points E and B. The operation of the apparatus will be understood without further explanation.

Figure 7:
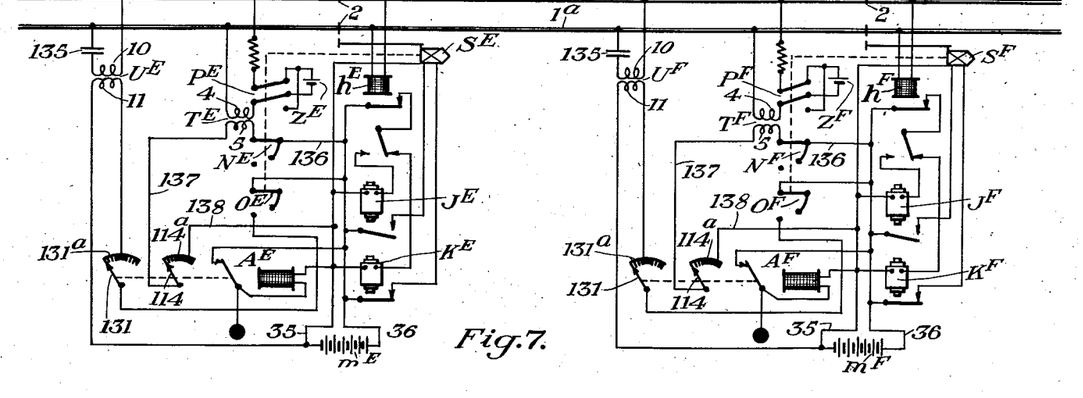

In the modification shown in Fig. 7, the apparatus for supplying the caution code to the section is the same as in Fig. 6, except that a condenser 135 is interposed between one rail of the section and the associated transformer U. This prevents short-circuiting the direct track circuit current but allows the alternating pulsations to pass from the transformer to the rails of the section.

Referring particularly to section E—F, the track battery Z$^F$ is constantly connected with the rails of the section through pole-changer P$^F$ and secondary winding 4 of a track transformer T$^F$. The primary of this transformer is provided with a circuit which passes from battery $m^F$, through wires 36 and 136, circuit controller N$^F$ operated by signal S$^F$, primary 5 of transformer T$^F$, wire 137, contact 114—114$^a$ of controller A$^F$, and wires 138 and 35 back to battery $m^F$. It will be plain from the foregoing that when signal S$^F$ is at stop, direct current of reverse relative polarity is consantly supplied to section E—F by battery Z$^F$, and that the caution code is superposed upon this current at point B by transformer U$^F$. When signal S$^F$ is at caution or proceed, the circuit for primary 11 of transformer U$^F$ is open at circuit controller O$^F$, direct current of normal relative polarity is constantly supplied to section E—F by battery Z$^F$, and the proceed code due to contact 114—114$^a$ is superposed upon this current by transformer T$^F$.

Figure 8:
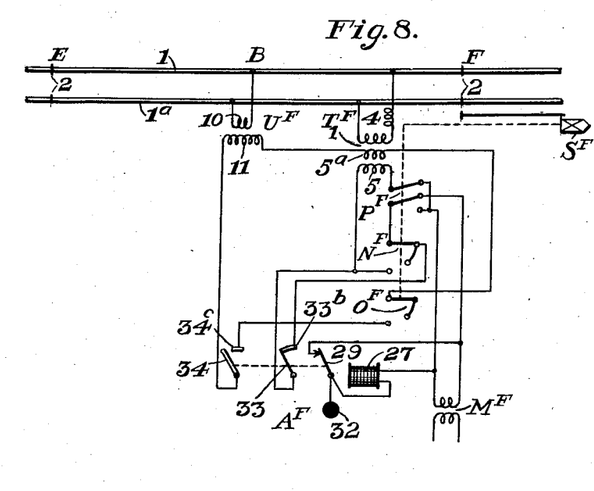
Fig. 8 is a view showing another modified form of trackway apparatus embodying my invention.
Figure 9:
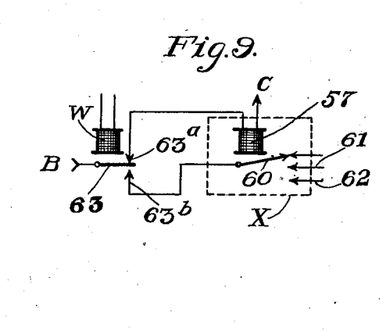
Fig. 9 is a view showing one form of train-carried apparatus suitable for co-operation with the trackway apparatus shown in Fig. 8.

In the apparatus shown in the preceding views the time measuring device on the train is arranged to measure the duration of time between impulses or groups of impulses, and the selection between signal indications given aboard the train is accomplished by varying this time interval. If desired, the selection between indications may be accomplished by varying the duration of each impulse or group of impulses, in which case the time measuring device on the train would, of course, measure the duration of each impulse or group of impulses instead of the duration of the time interval between groups. One form of apparatus embodying the modification just mentioned is illustrated in Figs. 8 and 9. Referring first to Fig. 8, the apparatus is the same as that shown in Fig. 1, except that when signal S$^F$ is in the proceed or caution position the circuit for the primary winding 5 of transformer T$^F_1$ includes a contact 33—33$^b$ which is closed at all times except for a short interval at the right-hand end of each stroke of the circuit controller A$^F$. It follows that when signal S$^F$ indicates proceed or caution, groups of impulses will be impressed on the rails of section E—F, each of which groups is substantially two seconds in duration, and which groups are separated by very short time intervals. When signal S$^F$ indicates stop, alternating current is continuously supplied to the primary 5 of transformer T$^F_1$, through pole-changer P$^F$ and circuit controller N$^F$. The circuit for the secondary 11 of transformer U$^F$ is then closed at circuit controller O$^F$, and this circuit includes contact 34—34$^c$, which is closed only for a very brief interval of time once each second. When this latter contact is closed, the impedance of transformer U$^F$ is materially reduced, so that the supply of alternating current between points E and B is practically discontinued. The result is that the track rails between points E and B carry groups of alternating current impulses, each group being substantially one second in duration and such groups being spaced by a very small time interval determined by the length of time during which contact 34—34$^c$ is closed.

It will be noted that the circuit for the secondary 11 of transformer U$^F$ includes a winding 5$^a$ in transformer T$^F_1$. The purpose of this winding is to assist transformer U$^F$ in drawing current from the track rails at point B and thereby assist the transformer in creating a short circuit across the rails at this point.

One form of train-carried apparatus suitable for co-operation with the trackway apparatus shown in Fig. 8 is shown in Fig. 9. This apparatus is the same as that shown in Fig. 2, except that the circuit for motor device 57 includes front contact 63—63$^a$ of relay W, and the circuits for slow-releasing relays 58 and 59 include back contact 63—63$^b$ of relay W. The time measuring device X is adjusted as in Fig. 2, so that after motor device 57 has been energized for substantially one second, contact 60—62 will close, and after this motor device has been energized for substantially two seconds contact 60—61 will close.

The operation of the apparatus shown in Figs. 8 and 9 is as follows:

While the train is on the section of track which is supplied with impulses in accordance with the proceed code, relay W will be energized for substantially two seconds at a time, and during this period contact 60—61 of motor device 57 will become closed. During the subsequent brief interval of de-energization of relay W and before contact 60—61 opens, the circuit for slow-releasing relay 59 will become closed through the back contact of relay W and contact 60—61 of motor device 57, and the motor device will then be restored to its initial condition prior to the next energization of relay W in response to the next group of impulses. When the caution code is being received, the operation will be the same, except that contact 60—62 will close at the expiration of each group of impulses, thereby causing slow-releasing relay 58 (see Fig. 2) to be energized.

Figure 10:
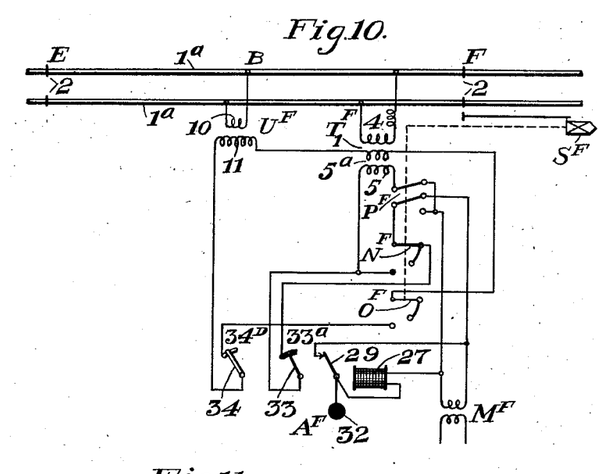
Fig. 10 is a view showing still another form of trackway apparatus embodying my invention.

In Fig. 10 I have shown one form of apparatus wherein a proceed indication is determined by the interval between groups of impulses, whereas a caution indication is determined by the duration of each group of impulses. When signal S$^F$ indicates proceed or caution, the circuit for primary winding 5 of transformer T$^F_1$ includes contact 33—33$^a$, which contact is closed for substantially two-thirds of a second and opened for substantially four-thirds of a second during each cycle of controller A$^F$. The proceed code consists, therefore, of groups each having a duration of two-thirds of a second, such groups being spaced by intervals each having a duration of four-thirds seconds. When signal S$^F$ indicates stop, alternating current is supplied continuously to the primary of transformer T$^F_1$ and so to the rails of section E—F, and the circuit for secondary winding 11 of transformer U$^F$ then includes contact 34—34$^D$ of the circuit controller A$^F$, which contact is closed for substantially two-thirds of a second and opened for substantially four-thirds of a second during each cycle of controller A$^F$. It follows that the track between points E and B is then supplied with groups of alternating current impulses each group having a duration of four-thirds of a second and the groups being spaced by intervals each of which has a duration of two-thirds of a second.

Figure 11:
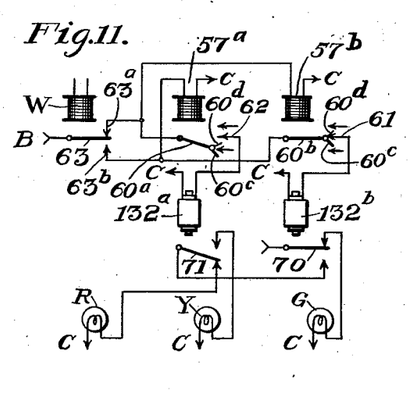
Fig. 11 is a view showing one form of train-carried apparatus suitable for co-operation with the trackway apparatus shown in Fig. 10.

In Fig. 11 I have shown one form of train-carried apparatus suitable for co-operation with the trackway apparatus shown in Fig. 10. Referring to Fig. 11, the single motor device 57 of Figs. 2 and 9 is replaced by two motor devices 57$^a$—57$^b$, provided respectively with contacts 60$^a$—62 and 60$^b$—61. Assuming that the proceed code is being received, relay W will be energized for two-thirds of a second and de-energized for four-thirds seconds. During the period of energization motor device 57$^b$ will be energized to close its contact 60$^b$—61, and during the period of de-energization of relay W motor device 57$^a$ will be energized beyond the point at which its contact 60$^a$—62 is closed. Assuming that motor device 57$^b$ has been operated to close its contact, then while the back contact of relay W is closed and before the contact of device 57$^b$ has had time to open, an auxiliary slow-releasing relay 132$^b$ will be energized. This relay controls a proceed lamp G in the same manner that the corresponding lamp is controlled in Fig. 2. Relay 132$^b$ is sufficiently slow-releasing to bridge the gap between successive closures of its energizing circuit. Assuming now that the caution code is being received, relay W will be de-energized for two-thirds of a second and energized for four-thirds of a second. During the period of de-energization motor device 57$^a$ will be operated to close its contact 60$^a$—62, and during the period of energization of relay W motor device 57$^b$ will be energized beyond the point of closure of its contact 60$^b$—61. After motor device 57$^a$ has been operated to close its contact and during the subsequent energization of relay W, a second auxiliary relay 132$^a$ becomes energized through the front contact of relay W and the contact of device 57$^a$. Relay 132$^a$ is slow-releasing in character and is arranged to bridge the gap between successive closings of its circuit. With relay 132$^a$ energized and relay 132$^b$ de-energized, the caution lamp Y will be lighted.

When the train is on the section of track which is continuously supplied with alternating current, relay W will be continuously energized so that motor device 57$^b$ will be energized and motor device 57$^a$ will be de-energized. The contact of each of these devices will then be open, so that both relays 132$^a$ and 132$^b$ will be de-energized and the stop lamp R will then be lighted. This is the condition which exists when signal S$^F$ is at stop and the train is between points B and F in the section of track shown in Fig. 10. On the other hand, if the supply of alternating current fails, relay W will be de-energized, whereupon the motor device 57ª will be energized and motor device 57ᵇ will be deenergized, so that the contact associated with each of these devices will be open and the stop lamp R will be lighted.

In Fig. 11 it will be noted that while the caution code is being received motor device 57ᵇ is operated beyond the point at which its contact 60ᵇ—61 closes, and then returns to its initial position while the back contact of relay W is closed. If contact 60ᵇ—61 were allowed to close during such return movement of motor device 57ᵇ the proceed indication relay 132ᵇ would become energized. To prevent this, contact 60ᵇ—61 is so arranged that it is closed during the upward swing of contact finger 60ᵇ but not closed during the downward swing of this finger. This may be accomplished in any suitable and desirable manner, and as here shown it is acomplished by providing the outer end of contact finger 60ᵇ with two tips 60ᶜ and 60ᵈ pivotally mounted on the finger, the former tip being of insulation and the latter tip being of electro-conductive material. During the upward movement of finger 60ᵇ, that is, during the operation of motor device 57ᵇ under the influence of current, tip 60ᵈ strikes the fixed contact 61 and closes the circuit, but during the return movement of finger 60ᵇ after this finger has gone above contact 61, the insulation tip 60ᶜ engages contact 61 and swings the electro-conductive tip 60ᵈ to such position that this tip does not engage the contact 61. Contact 60ª—62 of motor device 57ª is constructed in a similar manner and for the same reason.

Although I have herein shown and described only a few forms and arrangements of railway traffic controlling apparatus embodying my invention, it is understood that various changes and modifications may be made therein within the scope of the appended claims without departing from the spirit and scope of my invention.

Having thus described my invention, what I claim is:

1. Railway traffic controlling apparatus comprising means for supplying the trackway with groups of energy impulses, and traffic governing means selectively responsive to the durations of the intervals between such groups of impulses.

2. Railway traffic controlling apparatus comprising means for supplying the track rails with groups of energy impulses, and traffic governing means selectively responsive to the durations of such groups of impulses.

3. Railway traffic controlling apparatus comprising means for supplying the trackway with groups of energy impulses, and traffic governing means selectively responsive to the durations of such groups and of the intervals between such groups.

4. Railway traffic controlling apparatus comprising means for supplying the trackway with groups of energy impulses, and train carried traffic governing means selectively responsive to the durations of the intervals between such groups of impulses.

5. Railway traffic controlling apparatus comprising means for supplying the trackway with groups of energy impulses, and train carried traffic governing means responsive to the durations of such groups and to the durations of the intervals between groups.

6. Railway traffic controlling apparatus comprising timing means on a train arranged when energized to change in accordance with lapse of time, governing mechanism selectively controlled by said means in accordance with the length of time during which the means is energized, means for supplying the trackway with current according to different codes depending upon traffic conditions, and means responsive to such current for periodically energizing said timing means for different time intervals depending upon the code of such current.

7. Railway traffic controlling apparatus comprising time measuring means on a train, means for supplying the trackway with current according to different codes depending upon traffic conditions, means responsive to such current for causing operation of said time measuring means for different lengths of time depending upon the code of such current, and governing mechanism on the train controlled by said timing means.

8. Railway traffic controlling apparatus comprising time measuring means on a train, means for supplying the trackway with current according to different codes depending upon traffic conditions, means responsive to such current for causing operation of said time measuring means for different lengths of time depending upon the code of such current, and governing mechanism on the train selectively controlled by said time measuring means to give different indications depending on the length of time during which such means is operated.

9. Railway traffic controlling apparatus comprising timing means on a train arranged when in operation to change in accordance with lapse of time, means for supplying the trackway with current according to different codes depending upon traffic conditions, means selectively responsive to the code of such current for causing operation of said timing means for different lengths of time, and governing mechanism on the train selectively controlled by said timing means in accordance with the length of time during which such means is operated.

10. Railway traffic controlling apparatus comprising means for periodically supplying the trackway with spaced groups of energy impulses, means responsive to traffic conditions for varying the durations of the intervals between successive groups of impulses, and traffic governing means responsive to the durations of such time intervals.

11. Railway traffic controlling apparatus comprising means for supplying the trackway with energy in the form of successive groups of impulses, traffic governing apparatus, and time measuring means responsive to the durations of the intervals between such groups for controlling said apparatus.

12. Railway traffic controlling apparatus comprising time measuring means for supplying the trackway with groups of impulses, each group being separated from the preceding group by a time interval the duration of which is dependent upon traffic conditions, and traffic governing apparatus responsive to the lengths of said time intervals.

13. Railway traffic controlling apparatus comprising time measuring means for supplying the trackway with groups of impulses, each group being separated from the preceding group by a time interval the duration of which is dependent upon traffic conditions, and time measuring means on a vehicle selectively responsive to the lengths of said time intervals.

14. Railway traffic controlling apparatus comprising means for supplying the trackway with energy in the form of successive groups of impulses, each group being separated from the preceding group by a time interval, means responsive to traffic conditions for varying the lengths of such time intervals, and time measuring means on a vehicle responsive to the lengths of such time intervals.

15. In combination, a plurality of successive sections of railway track, means for supplying each section with energy in the form of spaced groups of impulses, means controlled by traffic conditions in each section for varying the spacing of such groups for the section next in rear, and traffic governing means selectively responsive to the spacing of such groups.

16. Railway traffic controlling apparatus comprising means for supplying the trackway with energy in the form of successive groups of impulses, a relay de-energized during the intervals between groups of impulses, time measuring means controlled by said relay for measuring the lengths of said intervals between groups of impulses, and traffic governing means controlled by said time measuring means.

17. Railway traffic controlling apparatus comprising means for supplying the trackway with energy in the form of spaced groups of impulses, means controlled by traffic conditions for varying the spacing of such groups, a relay arranged to be de-energized during the intervals between such groups of impulses, time measuring means controlled by said relay for measuring said intervals, and traffic governing means controlled by said time measuring means.

18. Railway traffic controlling apparatus comprising means for supplying the trackway with energy in the form of successive groups of impulses, each group being separated from the preceding group by a time interval, means controlled by traffic conditions for varying the lengths of said intervals, a contact arranged to be closed only during said time intervals, a second contact arranged to be closed only while the trackway is receiving said impulses, a time measuring device controlled by said first contact, and traffic governing means controlled by said device and by said second contact.

19. Railway traffic controlling apparatus apparatus comprising means for supplying the trackway with energy in the form of successive groups of impulses, each group being separated from the preceding group by a time interval, means controlled by traffic conditions for varying the lengths of said intervals, a contact arranged to be closed only during said time intervals, a second contact arranged to be closed only while the trackway is receiving said impulses, and traffic governing means controlled by said contacts.

20. Railway traffic controlling apparatus comprising means for supplying the trackway with energy in the form of successive groups of impulses, each group being separated from the preceding group by a time interval, means controlled by traffic conditions for varying the lengths of said intervals, a relay arranged to be continuously energized during each group of impulses, a contact closed when energizations of said relay are comparatively infrequent, a second contact closed when energizations of said relay are comparatively frequent, selecting means controlled by said first and said second contacts, and traffic governing means controlled by said selecting means.

21. In a railway traffic controlling system, a time measuring translating device, means for alternately energizing and deenergizing said translating device, traffic controlled means for varying the time during which said element is de-energized, and traffic governing means selectively controlled by said translating device.

22. Railway traffic controlling apparatus comprising a relay, means for periodically energizing said relay the time interval between such energizations being dependent upon traffic conditions, time measuring means controlled by said relay for measuring said interval, slow acting means controlled by said relay and by said time measuring means, and traffic governing means controlled by said slow acting means.

23. Railway traffic controlling apparatus comprising means for supplying the trackway with energy in the form of successive groups of impulses, means responsive to traffic conditions for varying the spacing between groups, a relay energized during each group of impulses, a time measuring device energized only when said relay is de-energized, slow acting means controlled by said time measuring device, and traffic governing apparatus controlled by said slow acting means.

24. Railway traffic controlling apparatus comprising a stretch of railway track, means responsive to traffic conditions and at times effective to supply said stretch constantly with energy and at other times effective to supply said stretch with energy in the form of successive groups of impulses each group being separated from the preceding group by a time interval, and traffic governing apparatus responsive to said time intervals but not to said constant energy.

25. Railway traffic controlling apparatus comprising a stretch of track, means controlled by traffic conditions for at times supplying the stretch with energy in the form of successive groups of impulses spaced by intervals of one length and for at other times supplying said section with energy impulses in groups spaced by intervals of a different length, time measuring means on a vehicle responsive to the lengths of said intervals, and traffic governing means controlled by said time measuring means.

26. Railway traffic controlling apparatus comprising a section of track, means controlled by traffic conditions for at times supplying energy to said section at one point in the form of successive groups of impulses spaced by intervals of one length and for at other times supplying said section at another point with energy impulses in groups spaced by intervals of a different length, time measuring means responsive to the lengths of said intervals, and traffic governing means controlled by said time measuring means.

27. Railway traffic controlling apparatus comprising means responsive to traffic conditions for at times connecting a source of alternating current across the track rails and for at other times supplying the track with energy in the form of successive groups of impulses, and traffic governing means responsive to such energy in the track.

28. Railway traffic controlling apparatus comprising means responsive to traffic conditions for at times supplying the track with alternating current and for at other times periodically interrupting said supply, and traffic governing apparatus responsive to such energy in the track.

29. Railway traffic controlling apparatus comprising means responsive to traffic conditions for at times supplying the track with alternating current and for at other times periodically interrupting said supply, and traffic governing apparatus responsive to the interrupted supply of current to display one indication but responsive to continuously supplied alternating current to display a different indication.

30. Railway traffic controlling apparatus comprising means for supplying the trackway with alternating current, means for at times periodically interrupting such supply, and traffic governing apparatus responsive to such interrupted current to display one indication but responsive to the continuous supply of alternating current to display a different indication.

31. Railway traffic controlling apparatus comprising means for supplying the trackway with alternating current, means for at times periodically interrupting such supply for a time interval the duration of which depends upon traffic conditions, and traffic governing apparatus, selectively responsive to the lengths of said intervals.

32. Railway traffic controlling apparatus comprising a stretch of track, means for at times supplying the rails of said stretch with energy at one point in the stretch, means responsive to traffic conditions for at times periodically short circuiting the rails at a second point in the stretch, and traffic governing means responsive to the current flowing in the track rails.

33. Railway traffic controlling apparatus comprising a stretch of track, means for at times supplying the rails of said stretch with energy at one point in the stretch, means responsive to traffic conditions for at times periodically drawing current from the rails at a second point in the stretch, and traffic governing means responsive to the current flowing in the track rails.

34. Railway traffic controlling apparatus comprising a stretch of railway track, means for supplying the stretch with successive groups of energy impulses, each group being separated from the preceding group by a time interval the duration of which is dependent upon traffic conditions, and train carried governing means comprising a first circuit closed when said intervals are relatively short, and a second circuit closed when said intervals are relatively long.

35. Railway traffic controlling apparatus comprising a stretch of railway track, means for supplying the stretch with successive groups of energy impulses, each group being separated from the preceding group by a time interval the duration of which is dependent upon traffic conditions, train carried governing means comprising two electro-responsive devices, and means for energizing one of said devices when said intervals are relatively short and for energizing the other said device when said intervals are relatively long.

36. Railway traffic controlling apparatus comprising a stretch of railway track, means for supplying the stretch with successive groups of energy impulses, each group being separated from the preceding group by a time interval the duration of which is dependent upon traffic conditions, time measuring means responsive to the lengths of such intervals, slow acting means controlled by said time measuring means, and train carried governing means controlled by said slow acting means.

37. Railway traffic controlling apparatus comprising a stretch of railway track, means for supplying the stretch with successive groups of energy impulses, each group being separated from the preceding group by a time interval the duration of which is dependent upon traffic conditions, train carried governing means comprising two slow acting relays, and means for energizing one of said relays when said intervals are relatively short and the other of said relays when said intervals are relatively long.

38. Railway traffic controlling apparatus comprising a stretch of railway track, means for supplying the stretch with successive groups of energy impulses, each group being separated from the preceding group by a time interval the duration of which is dependent upon traffic conditions, a transformer on a train, means on the train controlled by the impulses in the track rails for supplying corresponding groups of impulses to the primary of said transformer, a relay connected with the secondary of said transformer, and means controlled by said relay and responsive to said time intervals.

39. Railway traffic controlling apparatus comprising a stretch of railway track, means for supplying the stretch with successive groups of energy impulses, each group being separated from the preceding group by a time interval the duration of which is dependent upon traffic conditions, a transformer on a train, means on the train controlled by the impulses in the track rails for supplying corresponding groups of impulses to the primary of said transformer, a relay connected with the secondary of said transformer, rectifying means interposed between said relay and said transformer, and governing means controlled by said relay.

40. Railway traffic controlling apparatus comprising a stretch of railway track, means for supplying the stretch with successive groups of energy impulses, each group being separated from the preceding group by a time interval the duration of which is dependent upon traffic conditions, a transformer on a train, means on the train controlled by the impulses in the track rails for supplying corresponding groups of impulses to the primary of said transformer, a direct current relay connected with the secondary of said transformer, rectifying means interposed between said relay and said transformer, and time measuring means controlled by said relay.

41. In a train control system, in combination, a track, a vehicle travelling thereon, a member on the vehicle having an initial position, means for moving said member from initial position at a constant rate, impulse means controlled by traffic conditions for restoring said member to initial position, and indication means held at one indication only so long as the extent of movement of said member does not exceed or fall short of a substantially constant value.

42. Railway traffic controlling apparatus comprising a stretch of railway track, means for at times supplying energy to one end of said stretch, means intermediate the ends of said stretch for at times short circuiting said stretch but for removing said short circuit for a brief period at regular intervals, a trackway signal controlled by said energy, and train carried means responsive to the length of such intervals.

43. Railway traffic controlling apparatus comprising a plurality of successive sections of railway track, a signal for each section responsive to traffic conditions in advance, means controlled by each said signal for supplying the section next in rear with energy in the form of groups of impulses each group being separated from the preceding group by a time interval the duration of which is dependent upon the indication displayed by the signal, time measuring means selectively responsive to the lengths of said intervals, and governing means controlled by said time measuring means.

44. Railway traffic controlling apparatus comprising a stretch of railway track, means for at times supplying energy at one end of the stretch in the form of successive impulses each impulse being separated from the preceding impulse by a fixed time interval, means for at other times supplying said stretch at the said end with continuous energy, means at an intermediate point for short circuiting said stretch but for removing said short circuit for a brief period at regular intervals different from said first intervals, and train carried governing mechanism comprising time measuring means selectively responsive to the lengths of said intervals.

45. Railway traffic controlling apparatus comprising means controlled by traffic conditions for at times supplying the trackway with energy in the form of successive groups of energy of one relative polarity each such group being separated from the preceding group by a fixed time interval and for at other times supplying the trackway with energy in the form of successive groups of energy impulses of the other relative polarity each such group being separated from the preceding group by a time interval different from said first interval, trackway traffic governing means responsive to the polarity of such energy in the trackway, and train carried governing apparatus comprising time measuring means responsive to the lengths of such intervals.

46. Railway traffic controlling apparatus comprising means for supplying the trackway with a plurality of traffic controlling codes, each code comprising a series of groups of impulses and the time intervals between successive groups being different for different codes, and traffic governing means selectively responsive to the lengths of such time intervals.

47. Railway traffic controlling apparatus comprising time measuring means, means for supplying the trackway with current according to different codes depending upon traffic conditions, means selectively responsive to said codes for causing operation of said time measuring means for different lengths of time, and traffic governing means controlled by said time measuring means.

48. In combination, a stretch of railway track, a source of periodic current connected across the rails of the stretch, a transformer having one winding connected across the rails of the stretch, and means for at times short circuiting the remaining winding of said transformer.

49. In combination, a stretch of railway track, a source of periodic current connected across the rails of the stretch, a step-up transformer having a primary winding connected across the rails of the stretch, and means for at times short circuiting the secondary winding of said transformer.

50. In combination, a stretch of railway track, a source of periodic current connected across the rails of the stretch, a shunt path connected across the rails of the stretch, and means for at times reducing the impedance of said shunt path.

51. In combination, a stretch of railway track, a source of periodic current connected across the rails adjacent one end of the stretch, a transformer having one winding connected across the rails of the stretch, and means for at times short circuiting the remaining winding of the transformer.

52. In combination, a stretch of railway track, a source of periodic current connected across the rails of the stretch, a transformer having one winding connected across the rails of the stretch, and means responsive to traffic conditions for at times short circuiting the remaining winding of said transformer.

53. In combination, a stretch of railway track, a source of periodic current connected across the rails of the stretch, a transformer having one winding connected across the rails of the stretch, and means for at times reducing the impedance of said winding.

54. Railway traffic controlling apparatus comprising a plurality of successive sections of railway track, a train carried device arranged when in operation to change in accordance with lapse of time, means for each section for repeatedly operating said device for different intervals of time depending upon traffic conditions as the train moves through the associated section, and governing means selectively controlled by said device in accordance with the lengths of time during which such device is operated.

55. Railway traffic controlling apparatus comprising a plurality of successive sections of railway track, time measuring means on a train, traffic controlled aparatus for each said section for causing repeated operation of said time measuring means for different intervals of time depending on traffic conditions in advance as the train moves through the associated section, and governing means on the train controlled by said timing means.

56. Railway traffic controlling apparatus comprising a stretch of railway track, means for supplying said stretch with train controlling current in the form of code impulse combinations which vary in accordance with traffic conditions, and a train carried selector controlled in accordance with the code impulse combination of such current.

57. Railway traffic controlling apparatus comprising a stretch of railway track, means for supplying said stretch with train controlling current in the form of code impulse combinations which vary in accordance with traffic conditions, and means on a train for giving different indications depending upon the code impulse combinations of such current but responsive to a steady condition of such current to display still another indication.

58. Railway traffic controlling apparatus comprising a trackway, means for supplying energy to said trackway in cycles each comprising a surge of energy and an interval of time during which the current value is zero, and train carried governing means controlled in accordance with the lengths of said intervals and said surges.

59. Railway traffic controlling apparatus comprising a track way, means for suplying energy to said trackway in cycles each comprising a surge of energy and an interval of time during which the current value is zero, and governing means on a train including time measuring means selectively responsive to the lengths of said intervals and said surges.

60. Railway traffic controlling apparatus comprising a trackway, transmitting means located in the trackway for supplying the trackway with code impulse combinations, and train carried governing means including a selector continuously responsive to said code impulse combinations.

61. Railway traffic controlling apparatus comprising a plurality of successive sections of railway track, a selector on a train, means for each section for repeatedly actuating said selector by different codes depending an different traffic conditions as the train proceeds through the associated section, and governing means controlled by said selector.

62. Railway traffic controlling apparatus comprising a plurality of successive sections of railway track, a selector on a train, means for each section for repeatedly actuating said selector for different time intervals depending upon traffic conditions when the train proceeds through the associated section, and governing means on the train controlled by said selector and selectively responsive to such intervals.

63. In combination, a stretch of railway track, a relay, means for periodically energizing said relay, each such energization being separated from the preceding energization by a time interval the duration of which is dependent upon traffic conditions in said stretch, a time measuring device controlled by said relay, and comprising a first contact adapted to be closed when such device is energized for a relatively short interval of time and a second contact adapted to be closed when such device is energized for a relatively long interval of time, a first slow acting relay controlled by said first contact, a second slow acting relay controlled by said second contact, and a signal controlled by said slow acting relays.

64. In combination, a stretch of railway track, means for supplying said stretch with successive groups of impulses, each group being separated from the preceding group by a time interval, the duration of which is dependent upon traffic conditions, time measuring means responsive to the lengths of such intervals, and signaling means controlled by said time measuring means.

65. In combination, a stretch of railway track, means for supplying said stretch with successive groups of impulses, each group being separated from the preceding group by a time interval, time measuring means responsive to the lengths of such intervals, slow acting means controlled by said time measuring means, and a signal controlled by said slow acting means.

66. Railway traffic controlling apparatus comprising a track section, a source of energy for said section, traffic controlled means for alternately connecting said source to and disconnecting said source from said section, time measuring means for bridging the time period during which said source is connected with said section and the time period during which said source is disconnected from said section, and signaling means controlled by said time measuring means.

67. A method of transmitting influences corresponding to traffic conditions from a railroad trackway to a moving vehicle consisting of energizing a trackway circuit with alternating current, interrupting said current at a pre-arranged succession of time-spaced intervals, inductively receiving said current on a vehicle and operating vehicle-carried control means in accordance with the succession of interruptions of said received current.

68. A vehicle controlling system comprising, a conductor, means for supplying said conductor with groups of energy impulses, and vehicle carried means selectively responsive to the durations of the intervals between such groups of impulses.

69. A vehicle controlling system comprising, a conductor, means for energizing said conductor with recurrent time-spaced impulses each consisting of a plurality of cycles of alternating current, and receiving means on a vehicle selectively responsive to different durations of the time intervals between said impulses.

70. A vehicle controlling system comprising, a conductor, means operated in accordance with the lapse of time for intermittently energizing said conductor with recurrent groups of alternating current impulses, each group being separated from the preceding group by a time interval the duration of which is different for the different controls, and receiving means on the vehicle selectively responsive to the duration of the time interval between said groups.

71. The method of transmitting different controlling influences to moving vehicles which consists in intermittently energizing a stationary conductor with impulses of alternating current at recurring time-spaced intervals, varying the time-space intervals between said impulses according to a pre-arranged code, inductively receiving said current on a vehicle, and operating vehicle carried means in accordance with variations in the intervals of time between the interruptions of said received current.

72. In a vehicle controlling system, a source of alternating current, a conductor, controllable means for intermittently energizing said conductor from said source in any one of a plurality of repeated series of impulses of different time interval separation; receiving means on the vehicle including a coil in inductive relation to said conductor, an amplifier, and a main relay, said main relay being operated for each impulse; separate relays on the vehicle; and means on the vehicle controlled by said main relay and operated in accordance with the lapse of time for selectively controlling the energization of said separate relays in accordance with the different time intervals between said impulses.

73. A vehicle controlling system, a stationary conductor, controllable means for intermittently energizing said conductor with recurrent alternating current impulses sometimes spaced a predetermined fixed time intervals apart and at other times a different time interval, receiving means on a vehicle inductively influenced by the energizing of said conductor and including circuit controlling means operated in accordance with a lapse of time for closing different circuits dependent upon the time interval between said impulses, and indicating means governed by said circuits.

74. A system for controlling vehicles comprising, a stationary conductor, means for energizing said conductor with either one of two series of alternating current impulses, said impulses of said series being spaced at different time intervals, and vehicle carried means comprising a first contact closed when the intervals between said impulses are relatively short, and a second contact closed when said intervals are relatively long.

75. In a vehicle controlling system, a conductor, power operated means operable to supply periodically to said conductor spaced groups of alternating current impulses, said means being controllable to vary the duration of time intervening between the successive groups of said impulses in accordance with the control of the vehicle desired, a plurality of electro-responsive devices on the vehicle, and receiving means on the vehicle inductively influenced by the energization of said conductor for selectively controlling said electro-responsive devices in accordance with the different durations of said time intervals.

76. A vehicle controlling system comprising, vehicle-carried receiving apparatus including a relay, means for inductively operating said relay periodically by impulses according to a code having time intervals between impulses variable according to the control desired, a selector on the vehicle operated in accordance with the lapse of time and controlled by said relay for selectively closing contacts in accordance with the code of said impulses, and a plurality of circuits on the vehicle controlled by said relay and also selectively by said contacts of the selector for establishing different controlling conditions on the vehicle.

77. A vehicle controlling system comprising, a conductor, a source of alternating current, power-operated interrupters for intermittently connecting said source of current to said conductor to give recurrent impulses having time-spaced relations which are different for each interrupter, means for selecting the interrupter to be effective, receiving means on the vehicle inductively influenced by the energization of said inductor and including an amplifier and a relay, circuit controlling means on the vehicle operated in accordance with the lapse of time and set into operation by said relay, said circuit controlling means closing different contacts in accordance with the different time-spaced operations of said relay, and a plurality of circuits on the vehicle selectively controlled by said contacts and closed by operation of said relay.

78. In a vehicle controlling system, a transmitting conductor, a source of alternating current, power-operated interrupters for intermittently connecting said conductor to said source and energize said conductor with impulses of alternating current of substantially equal duration but with variable time intervals between said impulses according to the interrupter effective, means for selecting the interrupter to be effective, receiving means on a vehicle inductively influenced by the energization of said conductor, a plurality of electro-responsive devices on the vehicle, and selecting means governed by said receiving means for selectively energizing said electro-responsive devices in accordance with variable time intervals between the energization of said conductor as determined by the particular interrupter effective.

79. In combination, a section of railway track, a source of alternating current, and means including a pendulum for periodically connecting said source with the rails of said section.

80. In combination, a section of railway track, a source of alternating current, a member mounted to oscillate, electromagnetic means for causing sustained oscillation of said member, and means controlled by said member for periodically supplying train governing current from said source to the rails of said section.

81. In combination, a section of railway track, a source of alternating current, a member mounted to oscillate, contacts operated by said member, electromagnetic means supplied with current from said source and controlled by one of said contacts for causing sustained oscillation of said member, and means controlled by another of said contacts for periodically supplying train governing current from said source to the rails of said section.

82. In combination, a section of railway track, a source of current, and means including a pendulum for periodically supplying train governing current from said source to the rails of said section.

83. In combination, a section of railway track, a source of current, a pendulum, contacts operated by said pendulum, electromagnetic means supplied with current from said source and controlled by one of said contacts for causing sustained oscillation of said pendulum, and means controlled by another of said contacts for periodically supplying train governing current from said source to the rails of said section.

84. In combination with the rails of a railway track, an oscillating electric motor, a contact operated thereby, and means for supplying train governing current to said track rails through said contact.

85. In combination with the rails of a railway track, a pendulum, means for causing sustained oscillation of said pendulum, a contact periodically closed while said pendulum is in operation, and means for supplying train governing current to said rails through said contact.

86. In combination, a section of railway track, a member mounted to oscillate, a contact operated by said member, means controlled by said contact for causing sustained oscillation of said member, two additional contacts operated by said member in accordance with two codes, and means controlled by said additional contacts for supplying train governing current to the rails of said section in accordance with one of said codes or the other depending on traffic conditions in advance of the section.

In testimony whereof I affix my signature.

HERBERT A. WALLACE.